United States Patent [19]

Hodson

[11] Patent Number: 4,786,531

[45] Date of Patent: Nov. 22, 1988

[54] DEEP PENETRATING WATER RESISTANT SEALER COMPOSITION, ITS PREPARATION AND USE

[76] Inventor: James V. Hodson, 1650 E. 500 South, Fruit Heights, Utah 84037

[21] Appl. No.: 129,167

[22] Filed: Dec. 7, 1987

[51] Int. Cl.$^4$ .............................................. B05D 3/02
[52] U.S. Cl. .............................. 427/387; 106/287.13; 523/150; 523/157; 523/177; 523/333; 524/464; 524/465; 524/474; 524/792; 524/860
[58] Field of Search .................. 106/287.13; 523/150, 523/157, 177, 333; 524/464, 465, 474, 792, 860; 427/387

[56] References Cited

U.S. PATENT DOCUMENTS

| | | | |
|---|---|---|---|
| 4,018,564 | 4/1977 | Wright | 106/287.13 |
| 4,171,267 | 10/1979 | McAfee et al. | 106/287.13 |
| 4,634,724 | 1/1987 | Harvey et al. | 524/792 |

*Primary Examiner*—Melvyn I. Marquis
*Attorney, Agent, or Firm*—Thorpe, North and Western

[57] ABSTRACT

A deep penetrating sealer composition which renders the treated surface resistant to water, metal ions and chloride ion penetration comprising a mixture of (1) an aromatic solvent, (2) a chlorinated solvent, (3) an aliphatic hydrocarbon solvent, and (3) a hydroxy-substituted polyorganosiloxane.

19 Claims, No Drawings

DEEP PENETRATING WATER RESISTANT SEALER COMPOSITION, ITS PREPARATION AND USE

BACKGROUND OF THE INVENTION

1. Field of the Invention

This invention relates to a new type of sealer composition. More particularly, the invention relates to a new deep penetrating water resistant sealer composition, and a method for its preparation and use.

Specifically, the invention relates to a new deep penetrating sealer composition which renders the treated surface resistant to water, metal ions and chloride ion penetration. The new sealer compositions comprise a mixture of (1) an aromatic solvent, (2) a chlorinated solvent, (3) an aliphatic hydrocarbon solvent, and (3) a hydroxysubstituted polyorganosiloxane. The invention further provides a process for preparing the new compositions, and a process for utilizing the new compositions for the treating of surfaces, and particularly concrete surfaces, to prevent deterioration by water, salt and other chemicals.

2. Prior Art

During the past few years there has been tremendous activity in the building of concrete highways, runways, bridges, and the like. However, the extreme changes in temperature as well as addition of icing chemicals during the winter months, as well as exposure to other types of chemicals have caused a great deterioration of these concrete products, and many of them are now in a weakened condition and badly in need of repair. Furthermore, such concrete products are still being built and there is a great concern that unless some step is taken these new products will also fall into decay.

As a result of the above, many highway departments are now urgently seeking materials that can be used to prevent further deterioration of the concrete facilities now constructed, as well as something that can be used to prevent the newly constructed concrete products from deteriorating in the above-noted manner.

Many materials have been suggested for this purpose but have generally failed to meet the desired need. For example, many of the suggested materials have failed to have the penetration or adhesion to the concrete surfaces and are easily removed. Others fail to have the desired resistance to rapid change in temperature as well as resistance to the chemicals, such as salt, which are applied during the winter months. Still others fail to give the desired resistance to other deterioration chemicals, such as gasoline, solvents and the like. Other materials that have been suggested also tend to weaken the treated surfaces and fail to impart the needed compressive strength and other desired physical properties to the concrete products. In other cases, the suggested materials are difficult to prepare and have a short pot life so that they cannot be used on large areas, such as highways. Still others are expensive to product and the cost phohibits their use for large areas, such as highways and runways.

It is an object of the invention, therefore, to provide a new type of sealer composition which meets the above-noted need of the highway departments and construction companys. It is a further object to provide a new type of sealer composition which has unusually high penetration and good adhesion to all types of surfaces. It is a further object to provide a sealer composition which renders the treated surface resistant to water, metal ions and chloride ion penetration. It is a further object to provide a new sealer composition which is resistant to rapid freeze-thaw changes in temperature and still gives excellent water and chemical resistance. It is a further object to provide a sealer composition which is easy to prepare and apply to large surfaces, such as highways. It is a further object to provide a sealer composition which can be prepared at low cost and has long life and durability. It is a further object to provide a sealer composition which is non-flammable and safe for both the applicator and environment. These and other objects will be apparent from the following detailed description of the invention.

SUMMARY OF THE INVENTION

It has now been discovered that these and other objects can be accomplished by the new deep penetrating water resistance sealer compositions of the present invention which presents for the first time a practical sealer composition which meets the needs of the highway and construction fields.

The new sealer compositions of the present invention broadly comprise a mixture of (1) an aromatic solvent, (2) a chlorinated solvent, (3) an aliphatic hydrocarbon solvent, and (3) a hydroxy-substituted polyorganosiloxane. It has been surprisingly found that these new compositions are excellent sealers for all types of surfaces, and particularly for concrete and masonry surfaces. The new sealers differ from know coatings which stop at or near the surface and provide only a thin protection (e.g 1 to 4 mils), in that they penetrate very deeply even into several hundred mils and provide a very deep protective seal. In addition, the sealers render the treated surface resistant to water, metal ion and chloride ion penetration. In case of the concrete surfaces, it has been found that a considerable part of the deterioration in the past has been due to the penetration of such ions and as a result the present sealers provide excellent resistance to deterioration of the concrete and masonry surfaces by such means. As shown in the example at the end of the specification, the new sealer compositions render the treated product highly resistant to rapid freeze-thaw cycles and retains the same high resistance to the water, metal ion and chloride ion as before the beginning of the cycle. The new sealer compositions also fail to have any deteriorating effect on the physical properties of the treated product but in many cases, tend to strengthen such properties, as for example, the compressive strength of the treated product. In addition, the new sealer compositions are easy to prepare and apply to the surface, and particularly to large areas, such as highways and runways, and large bridge areas. Furthermore the new compositions are non-flammable and safe for both applicator and environment.

The new sealer compositions also have an added advantage in that their use can be modified to produce other valuable products. For example, they can be used to produce skidresistant surfaces by the addition of sand or aggregate to the top of the sealer coating before being allowed to air dry. In addition, other components can be added, such as epoxy resins, phenolic resins, and the like, to impart additional superior properties.

An important ingredient to the new sealer compositions of the present invention comprise the hydroxy-substituted polyorganosiloxanes. These are liquid to solid, low to high molecular weight products which are characterized in having free OH groups for cross-linking and an

group which is preferable substituted with aliphatic, cycloaliphatic or aromatic hydrocarbon radicals which may be further substituted with -OH, halogen atoms and the like. A particularly prefered group of such compounds comprise those of the general formula

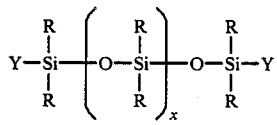

wherein at least one R is an OH group and the remaining Rs are members of the group consisting of hydrogen, alkyl radicals, aryl and alkylaryl radicals, x is an integer from 0 to 5, and Y is a member of the group consisting of hydrogen, OH, alkyl, aryl and alkylaryl radicals. Coming under special consideration are the hydroxy-substituted polyalkylsiloxanes, hydroxy-substituted polyarylsiloxanes, the hydroxy-substituted polyalkylarylsiloxanes wherein the alkyl, aryl and alkylaryl groups each contain from 1 to 10 carbon atoms.

Examples of such materials include, among others, dihydroxydimethyltetraphenyltrisiloxane, dihydroxytetramethyl tetrapropyltetrasiloxane, hydroxyheptyltrisiloxane, and higher molecular weight products including hydroxy-substituted polymethylpolysiloxane, hydroxy-substituted polyamylpolysiloxane and hydroxy-substituted polyphenylpolysiloxane. Other examples may be found in "Introduction to Chemistry of Silicones" by Eugene G. Rochow, John Wiley and So. 1946, and so much of that disclosure relative to the hydroxy-substituted polysiloxanes is incorporated herein by reference.

The aromatic solvents to be used in preparing the new compositions of the invention include those liquid mono- or polynuclear aromatic hydrocarbons and their substituted derivatives, such as, for example, toluene, xylene, cumene, mesitylene, ethylbenzene, propylbenzene, trimethylbenzene, amylbenzene, and the like, and mixtures thereof Particularly preferred aromatic solvents to be used include the mononuclear aromatic hydrocarbons and their alkyl substituted derivatives, preferably containing a total of up to 16 carbon atoms.

The chlorinated solvent to be used in preparing the new compositions of the invention can be any liquid chlorinated aliphatic, cycloaliphatic or aromatic compound, such as, for example, methylene chloride, trichloroethane, perchloroethylene, chlorotoluene, chloroxylene, trichlorobenzene, dichlorobenzene. Particularly preferred chlorinated solvents to be used include the mono-, di- and trichlorinated aliphatic, cycloaliphatic, aromatic and alkyl-substituted aromatic hydrocarbons, preferably those containing up to 12 carbon atoms.

The aliphatic solvents to be used in preparing the new compositions of the invention include those liquid aliphatic and cycloaliphatic hydrocarbons, such as, for example, amylene, hexene, heptane, cyclohexane, cyclohexene, octane, and the like, and mixtures thereof.

Particularly preferred aliphatic solvents to be used include the aliphatic hydrocarbons containing from 5 to 8 hydrocarbons, and mixtures thereof.

The amount of the four components to be used in preparing the new sealer compositions can vary within certain limits. The amount of the aromatic solvent should be under 20% by volume of the total mixture, and preferably between 10% and 20% by volume. The amount of the chlorinated solvent should be under 65% by volume and preferably between 35% and 65% by volume. The amount of the aliphatic solvent should be under 40% by volume and preferably between 10% and 40% by volume. The amount of the hydroxy-substituted polyorganosiloxane to be used in making the new compositions should be under 20 % by volume and preferably between 6% and 20% by volume, with the total volume of solvent and siloxane being 100%.

The new sealer compositions of the present invention are prepared by first solubilizing the hydroxy-substituted polyorganosiloxane in the aromatic solvent by adding the solid or liquid siloxane to the solvent and stirring until solubilization has taken place. The chlorinated solvent is then added to the mixture of siloxane and aromatic solvent and stirred until a uniform solution is obtained. The aliphatic solvent is then added to the combined mixture as the last ingredient. The mixing is preferably done at ambient temperature, but slightly elevated temperatures may be used as desired or necessary.

The sealer composition prepared as above is a fluid clear to opague liquid which is non-flammable and has excellent shelf stability. As noted above, the new compositions are particularly outstanding as sealers for all types of surfaces. They are particularly suited for use as sealers for concrete and masonry surfaces, metal surfaces, asphaltic surfaces, wood surfaces, such as concrete highways, runways, sidewalks, concrete floors, bricks, natural stones, marble, coral, anodized aluminum, iron, copper, woods, such as cedar, red wood, firs and the like.

The application of the sealer to such surfaces may be accomplished in any suitable manner, such as brushing, spraying, dipping and the like. Because the sealer compositions quickly penetrate into the surface being treated, especially in absorbent surfaces such as the concrete and masonry surfaces, only a very thin film of the sealer may be found on the surface. In case a thicker coating is desired on the surface, additional applications can be made. However, in most cases, a single application is all that is desired to obtain the above-noted superior properties.

After the sealer has been applied to the surface, the sealer is then allowed to dry in air. At ambient temperatures the sealer is dried in from 4 to 24 hours depending on the surface and number of applications applied.

In the above-noted applications, the sealer compositions can be used as such or they can be modified by addition of other ingredients. For example, they can be used to prepare skid-resistant surfaces by the addition of sand or fine agrregate to the top of the sealer surface before the coating has allowed to air dry. The size of the particles may vary over a wide range depending on the intended use. In general aggregate is finely divided and has a size from about 1/64 to 1/16 inch, and made up of such materials as crushed rock, crushed quartz, aluminum oxide particles and the like.

Additional modification can be obtained by the addition to the sealer composition of thermoplastic or thermosetting resinous materials, such as epoxy resins, phenolic resins, polycarbonates, polyolefins, alkyd resins and the like, and mixtures thereof. In many cases the addition of epoxy resins, such as the polyepoxides having an epoxy equivalency greater than 1.0 as the polyglycidyl ethers of polyhydric phenols, is particularly desirable as the resulting compositions have many new desirable properties.

As noted above, the new compositions represent a unique formulation designed to protect concrete and masonry products from water and chemical attack and provide greatly improved durability of substrate. Particularly any concrete or masonary surfaces that are exposed to freeze-thaw, de-icing salt spray, acid rain, re-bar corrosion, surface scaling or dusting action deterioration can be protected by the present sealer compositions. As indicated, the sealer compositions deeply penetrates and forms a deep permanent water-proofing barrier to preserve the product, and acts by preventing the penetration of the water, metal and chloride ions from within or without.

To illustrate the preparation and superior properties of the new sealer compositions the following examples are given. It is understood that these examples are given only for the purpose of illustration and should not be regarded as limiting the invention in any way. Unless otherwise indicated, parts disclosed in the examples are parts by volume. The concrete used in the testing comprised hydraulic cement (Portland Cement).

EXAMPLE I

This example illustrates the preparation and superior properties of a sealer composition preparing according to the above using hydroxy-substituted polymethylsiloxane which is a flaked low molecular weight solid having a specific gravity in 50% xylene of 1.23 and a viscosity of 23 cps.

10 Parts of the hydroxy-substituted polymethylsiloxane was dissolved in 10 parts by volume of xylene and the mixture stirred to effect complete solubilization. To this mixture was added 30 parts by volume of methylene chloride and the mixture stirred to effect complete mixing. Finally 20 parts by volume of an aliphatic solvent made up of $C_5$ to $C_8$ aliphatic hydrocarbons was added to the mixture and the mixture stirred to form the desired sealer composition.

The composition was a clear fluid liquid having a specific gravity of 1.08, viscosity of 3 cps., and unlimited shelf life.

The superior properties of the above sealer composition in imparting high resistance to concrete blocks when exposed to repeated freeze-thaw cycles in brine solution is illustrated below:

Freeze-thaw Resistance (ASTM Test No. C-642)

A concrete block was dipped in the above-noted sealer composition for about 30 seconds and then withdrawn and air dried for about 24 hours.

The block so treated was then dipped in a 10% brine solution containing 3% to 10% concentrations of calcium, sodium, zinc, magnesium and potassium chlorides. The block so treated was then subject to a freeze-thaw cycle of 0° F. to 120° F. for about 40 times.

A control block of concrete which was not treated with the sealer composition was then subjectd to the same freeze thaw cycle.

Following the above treatment, the blocks were dried and weighed, and the different in the weight before and after the treatment was determined. The weight loss of the block treated with the new sealer compositions of the present invention had a weight loss of only 0.49%, while the weight loss of the control was 42%. To comply with most state requirements there must be less than 3% weight loss after such a treatment, and the new compositions greatly exceed this requirement.

EXAMPLE II

Example I is repeated with the exception that the hydroxy-substituted polymethylsiloxane is replaced with each of the following: hydroxy-substituted polybutylsiloxane, hydroxy-substituted polyphenylmethylsiloxane. Related results are obtained.

EXAMPLE III

Example I is repeated with the exception that the aromatic solvent is replaced by toluene, the chlorinated solvent is replaced by trichloroethane and the aliphatic solvent is replaced by hexene. Related results are obtained.

EXAMPLE IV

Example I is repeated with the exception that the surface to which the sealer composition is applied is as follows: asphalt surface, aluminum metal surface, brick surface. Related results are obtained.

I claim as my invention:

1. A deep penetrating water-resistant sealer composition comprising a mixture of (1) an aromatic hydrocarbon solvent, (2) a chlorinated hydrocarbon solvent, (3) an aliphatic hydrocarbon solvent, and (4) a hydroxy-substituted polyorganosiloxane, the amount of the aromatic hydrocarbon solvent being under 20% by volume, the amount of the chlorinated hydrocarbon solvent being under 65% by volume, the amount of the aliphatic hydrocarbon solvent being under 40% by volume, and the amount of the hydroxy-substituted polyorganosiloxane being under 20% by volume.

2. A composition as in claim 1 wherein the aromatic hydrocarbon solvent is present from 10% to 20% by volume, the chlorinated hydrocarbon solvent is present from 35% to 65% by volume, the aliphatic hydrocarbon solvent is present from 10% to 40% by volume and the hydroxy-substituted polyorganosiloxane is present from 6% to 20% by volume, with the total being 100% by volume.

3. A composition as in claim 1 wherein the hydroxy-substituted polyorganosiloxane is one of the formula

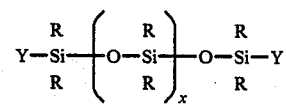

wherein R is an OH or a mixture of OH and a member selected from the group consisting of hydrogen, alkyl radicals, aryl and alkylaryl radicals, x varies from 0 to 5, and Y is selected from the group consisting of hydrogen, OH, alkyl, aryl and alkaryl radicals.

4. A composition as in claim 1 wherein the hydroxy-substituted polyorganosiloxane is a hydroxy-substituted polyalkylsiloxane.

5. A composition as in claim 1 wherein the hydroxy-substituted polyorganosiloxane is a hydroxy-substituted polymethylsiloxane.

6. A composition as in claim 1 wherein the aromatic hydrocarbon solvent is a mononuclear aromatic hydrocarbon containing up to 12 carbon atoms.

7. A composition as in claim 1 wherein the chlorinated hydrocarbon solvent is an aliphatic or aromatic hydrocarbon substituted with from 1 to 3 chlorine atoms.

8. A composition as in claim 1 wherein the aliphatic hydrocarbon solvent is an aliphatic hydrocarbon containing from 5 to 8 hydrocarbons.

9. A composition as in claim 1 wherein the aromatic hydrocarbon solvent is xylene, the chlorinated hydrocarbon solvent is a mixture of aliphatic hydrocarbons containing from 5 to 8 carbon atoms.

10. A process for preparing a deep penetrating water-resistant sealer composition which comprises adding up to 20% by volume of a hydroxy-substituted polyorganosiloxane to up to 20% by volume of an aromatic hydrocarbon solvent, adding to the resulting mixture up to 65% by volume of a chlorinated hydrocarbon solvent and then adding to the resulting mixture up to 40% by volume of an aliphatic hydrocarbon solvent.

11. A process as in claim 10 wherein the hydroxy-substituted polyorganosiloxane is a hydroxy-substituted polyalkylsiloxane.

12. A process as in claim 10 wherein the aromatic hydrocarbon solvent is a mononuclear aromatic hydrocarbon containing up to 10 carbon atoms, the chlorinated hydrocarbon solvent is an aliphatic or aromatic hydrocarbon substituted with from 1 to 3 chlorine atoms, and the aliphatic hydrocarbon solvent is a mixture of aliphatic hydrocarbons containing 5 to 8 carbon atoms.

13. A process for treating a surface to make it resistant to water, metal ions and chloride ions penetration which comprises applying to the surface a liquid sealer composition comprising a mixture of (1) an aromatic hydrocarbon solvent, (2) a chlorinated hydrocarbon solvent, (3) an aliphatic hydrocarbon solvent, and (4) a hydroxy-substituted polyorganosiloxane, and allowing the resulting coating to air dry.

14. A process as in claim 13 wherein the surface to be treated is a silicious bearing material selected from the group consisting of concrete, brick and stone.

15. A process as in claim 13 wherein the surface to be treated is an asphaltic surface.

16. A process as in claim 13 wherein the surface to be treated is a metal surface.

17. A process as in claim 13 wherein the surface to be treated is a cellulosic material.

18. A process as in claim 13 wherein the hydroxy-substituted polyorganosiloxane is a hydroxy-substituted polyalkylsiloxane.

19. A process as in claim 13 wherein the chlorinated hydrocarbon solvent is methylene chloride.

* * * * *